US012790167B2

(12) United States Patent
Vishal

(10) Patent No.: US 12,790,167 B2
(45) Date of Patent: Nov. 10, 2026

(54) SYSTEM AND METHOD TO ENABLE COMMUNICATION BETWEEN CONTROL COMPONENTS OF A PNEUMATIC VACUUM ELEVATOR

(71) Applicant: Ruphavathy Vishal, Chennai (IN)

(72) Inventor: Ruphavathy Vishal, Chennai (IN)

(73) Assignee: Ruphavathy Vishal, Chennai (IN)

( * ) Notice: Subject to any disclaimer, the term of this patent is extended or adjusted under 35 U.S.C. 154(b) by 574 days.

(21) Appl. No.: 18/374,051

(22) Filed: Sep. 28, 2023

(65) Prior Publication Data

US 2024/0228227 A1 Jul. 11, 2024

(51) Int. Cl.

| | |
|---|---|
| ***B66B 9/04*** | (2006.01) |
| ***B66B 1/30*** | (2006.01) |
| ***B66B 1/34*** | (2006.01) |
| ***B66B 1/50*** | (2006.01) |
| ***B66B 11/02*** | (2006.01) |
| ***G08C 17/02*** | (2006.01) |

(52) U.S. Cl.

CPC .............. *B66B 1/3461* (2013.01); *B66B 1/30* (2013.01); *B66B 1/3492* (2013.01); *B66B 1/50* (2013.01); *B66B 9/04* (2013.01); *B66B 11/0226* (2013.01); *G08C 17/02* (2013.01); *B66B 2201/4623* (2013.01)

(58) Field of Classification Search

CPC ................................ B66B 1/3492; B66B 9/04
See application file for complete search history.

(56) References Cited

U.S. PATENT DOCUMENTS

| | | | | | |
|---|---|---|---|---|---|
| 5,583,326 | A * | 12/1996 | Sors | B66B 9/04 | 187/277 |
| 6,085,873 | A * | 7/2000 | Macchi | B65G 51/04 | 187/400 |
| 9,248,995 | B2 * | 2/2016 | Ascua | F16K 7/14 | |
| 10,051,040 | B2 * | 8/2018 | Marvin | B66B 1/3446 | |
| 10,793,394 | B2 * | 10/2020 | Ginsberg | B66B 1/3446 | |
| 2010/0320036 | A1 * | 12/2010 | Ferreira | B66B 1/3492 | 187/394 |
| 2011/0108368 | A1 * | 5/2011 | Yamamoto | B66B 11/024 | 187/293 |
| 2013/0228400 | A1 * | 9/2013 | Terry | B66B 1/285 | 187/394 |
| 2014/0131140 | A1 * | 5/2014 | Verde | B66B 9/04 | 187/250 |

(Continued)

*Primary Examiner* — Rina I Duda
(74) *Attorney, Agent, or Firm* — Jason C. Cameron

(57) ABSTRACT

A system 10 to enable communication between one or more control components of a pneumatic vacuum elevator is provided. The system includes an elevator cabin 20 to transport passengers between one or more levels of a structure. The system includes a first communication unit 40 including first transceivers 50 to receive inputs from the passengers through a cabin operating panel 60. The first transceivers are also to transmit the inputs received from the cabin operating panel wirelessly in a predefined direction. The system includes a second communication unit 70 including second transceivers 80 to generate control signals upon receiving the inputs transmitted by the first transceivers. The second transceivers are to provide the control signals generated to motors to create a pressure differential in an external cylinder 30 to move the elevator cabin through the external cylinder.

7 Claims, 2 Drawing Sheets

(56) References Cited

U.S. PATENT DOCUMENTS

| | | | | |
|---|---|---|---|---|
| 2014/0238781 | A1* | 8/2014 | Ascua | B66B 9/04 187/250 |
| 2017/0190424 | A1* | 7/2017 | Brown | B64C 1/18 |
| 2019/0106293 | A1* | 4/2019 | Ascua | B66B 7/047 |
| 2020/0122963 | A1 | 4/2020 | Pahlke | |
| 2021/0284503 | A1 | 9/2021 | Witczak et al. | |
| 2022/0002113 | A1 | 1/2022 | De Piano et al. | |
| 2022/0033217 | A1 | 2/2022 | Roberts et al. | |

* cited by examiner

SYSTEM AND METHOD TO ENABLE COMMUNICATION BETWEEN CONTROL COMPONENTS OF A PNEUMATIC VACUUM ELEVATOR

CROSS-REFERENCE TO RELATED APPLICATION

This application claims priority from a Patent application filed in India having Patent Application No. 202341001197, filed on Jan. 5, 2023, and titled "SYSTEM AND METHOD TO ENABLE COMMUNICATION BETWEEN CONTROL COMPONENTS OF A PNEUMATIC VACUUM ELEVATOR".

FIELD OF INVENTION

Embodiments of the present disclosure relate to a field of elevators and more particularly to a system and a method to enable communication between one or more control components of a pneumatic vacuum elevator.

BACKGROUND

An elevator is a machine which transports people and freights between different levels of a structure. The structure may include a building, a maritime vessel and the like. The elevator may be classified as a cable-assisted elevator, a hydraulic cylinder-assisted elevator, and a pneumatic vacuum elevator based on an actuation method of the elevator. Cables attached to an elevator cabin may be used to actuate the cable-assisted elevator. Similarly, hydraulic pistons associated with the elevator cabin may be used to actuate the hydraulic cylinder-assisted elevator. The pneumatic vacuum elevator utilizes vacuum created in an external cylinder to move the elevator cabin through the external cylinder.

A shaft controller located in the external cylinder may actuate motors to create the vacuum inside the external cylinder corresponding to inputs provided by the people through a cabin operating panel located in the elevator cabin. Inputs provided by the people through the cabin operating panel may be relayed to the shaft controller through a cabin controller located inside the elevator cabin. Currently, communications between the cabin controller and the shaft controller may happen through wires running between the cabin controller and the shaft controller. Weight of the wires may increase at par with length of the external cylinder and may eventually increase the weight of the elevator cabin, thereby increasing cost of the motors associated with the elevator cabin. Further, the wires may cause latency in the communications happening between the cabin controller and the shaft controller, thereby affecting functionality of the pneumatic vacuum elevator. Also, the wires are prone to damage due to various reasons such as movement of the elevator cabin and infestation of rodents. Furthermore, the wires may hamper aesthetic appeal of the pneumatic vacuum elevator.

Hence, there is a need for an improved system and a method to enable communication between one or more control components of a pneumatic vacuum elevator to address the aforementioned issue(s).

BRIEF DESCRIPTION

In accordance with an embodiment of the present disclosure, a system to enable communication between one or more control components of a pneumatic vacuum elevator is provided. The system includes an elevator cabin positioned in an external cylinder of the pneumatic vacuum elevator. The elevator cabin is adapted to move bidirectionally through the external cylinder to transport one or more passengers between one or more levels of a structure. The system also includes a first communication unit operatively coupled to the elevator cabin. The first communication unit includes one or more first transceivers adapted to receive one or more inputs from the one or more corresponding passengers through a cabin operating panel located in the elevator cabin. The one or more first transceivers are also adapted to transmit the one or more inputs received from the cabin operating panel wirelessly in a predefined direction. The system further includes a second communication unit communicatively coupled to the first communication unit and positioned at a first predefined portion of the external cylinder. The second communication unit includes one or more second transceivers adapted to generate one or more control signals upon receiving the one or more inputs transmitted by the one or more first transceivers. The one or more second transceivers are also adapted to provide the one or more control signals generated to one or more motors located at the first predefined portion of the external cylinder to create a pressure differential in the external cylinder to move the elevator cabin through the external cylinder, thereby enabling the communication between the one or more control components of the pneumatic vacuum elevator.

In accordance with an embodiment of the present disclosure, a method to enable communication between one or more control components of a pneumatic vacuum elevator is provided. The method includes moving an elevator cabin bidirectionally through an external cylinder to transport one or more passengers between one or more levels of a structure. The method also includes receiving, by one or more first transceivers of a first communication unit, one or more inputs from the one or more corresponding passengers through a cabin operating panel located in the elevator cabin. The method also includes transmitting, by the one or more transceivers of the first communication unit, the one or more inputs received from the cabin operating panel wirelessly in a predefined direction. The method further includes generating, by one or more second transceivers of a second communication unit, one or more control signals upon receiving the one or more inputs transmitted by the one or more first transceivers. The method also includes providing, by the one or more second transceivers of the second communication unit, the one or more control signals generated to one or more motors located at the first predefined portion of the external cylinder to create a pressure differential in the external cylinder to move the elevator cabin through the external cylinder, thereby enabling the communication between the one or more control components of the pneumatic vacuum elevator.

To further clarify the advantages and features of the present disclosure, a more explicit description of the disclosure will follow by reference to specific embodiments thereof, which are illustrated in the appended figures. It is to be appreciated that these figures depict typical embodiments of the disclosure and are therefore not to be considered limiting in scope. The disclosure will be described and explained with additional details with the appended figures.

BRIEF DESCRIPTION OF THE DRAWINGS

The disclosure will be described and explained with additional specificity and detail with the accompanying figures in which.

Figure 1:
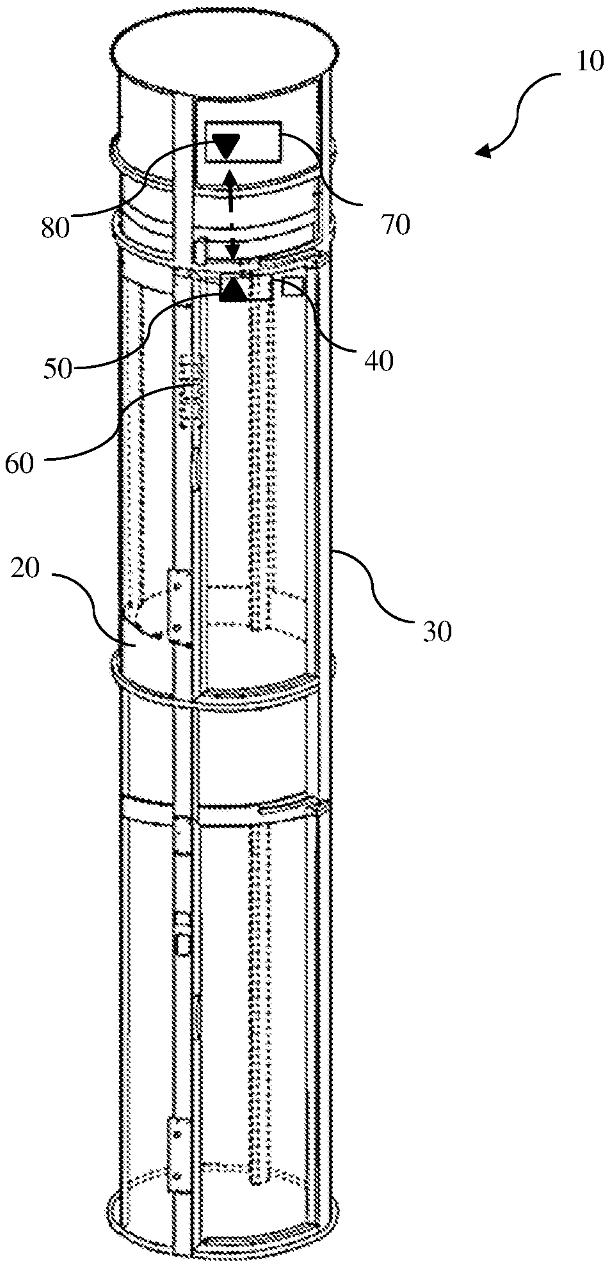
FIG. 1 is a schematic representation of a system to enable communication between one or more control components of a pneumatic vacuum elevator in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

To promote an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method to enable communication between one or more control components of a pneumatic vacuum elevator. The system includes an elevator cabin positioned in an external cylinder of the pneumatic vacuum elevator. The elevator cabin is adapted to move bidirectionally through the external cylinder to transport one or more passengers between one or more levels of a structure. The system also includes a first communication unit operatively coupled to the elevator cabin. The first communication unit includes one or more first transceivers adapted to receive one or more inputs from the one or more corresponding passengers through a cabin operating panel located in the elevator cabin. The one or more first transceivers are also adapted to transmit the one or more inputs received from the cabin operating panel wirelessly in a predefined direction. The system further includes a second communication unit communicatively coupled to the first communication unit and positioned at a first predefined portion of the external cylinder. The second communication unit includes one or more second transceivers adapted to generate one or more control signals upon receiving the one or more inputs transmitted by the one or more first transceivers. The one or more second transceivers are also adapted to provide the one or more control signals generated to one or more motors located at the first predefined portion of the external cylinder to create a pressure differential in the external cylinder to move the elevator cabin through the external cylinder, thereby enabling the communication between the one or more control components of the pneumatic vacuum elevator.

FIG. 1 is a schematic representation of a system 10 to enable communication between one or more control components of a pneumatic vacuum elevator in accordance with an embodiment of the present disclosure. In one embodiment, the one or more control components may include, but not limited to, a shaft controller, a cabin controller, a landing operating panel and the like. The system 10 includes an elevator cabin 20 positioned in an external cylinder 30 of the pneumatic vacuum elevator. The elevator cabin 20 is adapted to move bidirectionally through the external cylinder 30 to transport one or more passengers between one or more levels of a structure. In one embodiment, the structure may include, but not limited to, a building, a maritime vessel and the like.

Further, in one embodiment, the elevator cabin 20 may include an energy storage unit to power one or more electrical appliances associated with the elevator cabin 20. In such an embodiment, the energy storage unit may include, but not limited to, batteries, super capacitors and the like. In one embodiment, the one or more electrical appliances may include, but not limited to, lights, fans, music systems and the like. In some embodiments, the elevator cabin 20 may include one or more light detection and ranging sensors positioned at least on a ceiling of the elevator cabin 20 and a floor of the elevator cabin 20. In such an embodiment, the one or more light detection and ranging sensors may be adapted to relay one or more relative positions of the elevator cabin 20 to the shaft controller to enable the shaft controller to regulate a speed of the elevator cabin 20.

Furthermore, the system 10 also includes a first communication unit 40 operatively coupled to the elevator cabin 20. The first communication unit 40 includes one or more first transceivers 50 adapted to receive one or more inputs from the one or more corresponding passengers through a cabin operating panel 60 located in the elevator cabin 20. In one embodiment, the one or more inputs may include a preferred level of the structure at which the one or more corresponding passengers may intend to get down. The one or more first transceivers 50 are also adapted to transmit the one or more inputs received from the cabin operating panel 60 wirelessly in a predefined direction. As used herein, the predefined direction may be a direction at which another transceiver is positioned to receive the one or more inputs being transmitted by the one or more first transceivers 50.

Moreover, the system 10 further includes a second communication unit 70 communicatively coupled to the first communication unit 40 and positioned at a first predefined portion of the external cylinder 30. In one embodiment, the first predefined position may be, at least one of the extremities of the external cylinder 30. The second communication unit 70 includes one or more second transceivers 80 adapted to generate one or more control signals upon receiving the one or more inputs transmitted by the one or more first transceivers 50. In one embodiment, the one or more first transceivers 50 and the one or more second transceivers 80 may adapt line of sight communication.

Additionally, the one or more second transceivers 80 are also adapted to provide the one or more control signals generated to one or more motors (not shown in FIG. 1) located at the first predefined portion of the external cylinder 30 to create a pressure differential in the external cylinder 30 to move the elevator cabin 20 through the external cylinder 30, thereby enabling the communication between the one or more control components of the pneumatic vacuum elevator. In some embodiments, the one or more motors may include an alternating current motor. In another embodiment, the one or more motors may include a direct current motor. In one embodiment, the one or more first transceivers 50 and the one or more second transceivers 80 may be adapted to communicate bidirectionally.

Also, in some embodiments, the one or more first transceivers 50 and the one or more second transceivers 80 may be adapted to communicate via at least one of a communication mode comprising bluetooth, long range radio and wireless fidelity. As used herein, the blue tooth may be defined as a standard used for enabling short range wireless communication. As used herein, the long range radio may be defined as the standard used for long range wireless communication assisted with spread spectrum modulation. As used herein, the wireless fidelity may be defined as the standard used to enable local area networking of various devises. In a specific embodiment, the one or more first transceivers 50 and the one or more second transceivers 80 may be adapted to interconnect through respective media access control (MAC) address.

Further, as used herein, the mac address may be defined as a physical address assigned to each of the devices present in a network to enable identification of the same. In one embodiment, the one or more first transceivers 50 and the one or more second transceivers 80 may be adapted to communicate each other by establishing a datalink layer between the one or more first transceivers 50 and the one or more second transceivers 80. As used herein, the data link layer may be defined as a protocol layer responsible for enabling communication between devices present in the network across a physical layer. In some embodiments, the one or more first transceivers 50 and the one or more second transceivers 80 are adapted to establish a communication channel between the one or more first transceivers 50 and the one or more second transceivers 80 upon restarting at least one of the one or more first transceivers 50 and the one or more second transceivers 80.

Furthermore, in a specific embodiment, the one or more first transceivers 50 and the one or more second transceivers 80 may be adapted to establish a communication channel between the one or more first transceivers 50 and the one or more second transceivers 80 upon resetting at least one of the one or more first transceivers 50 and the one or more second transceivers 80.

Figure 2:
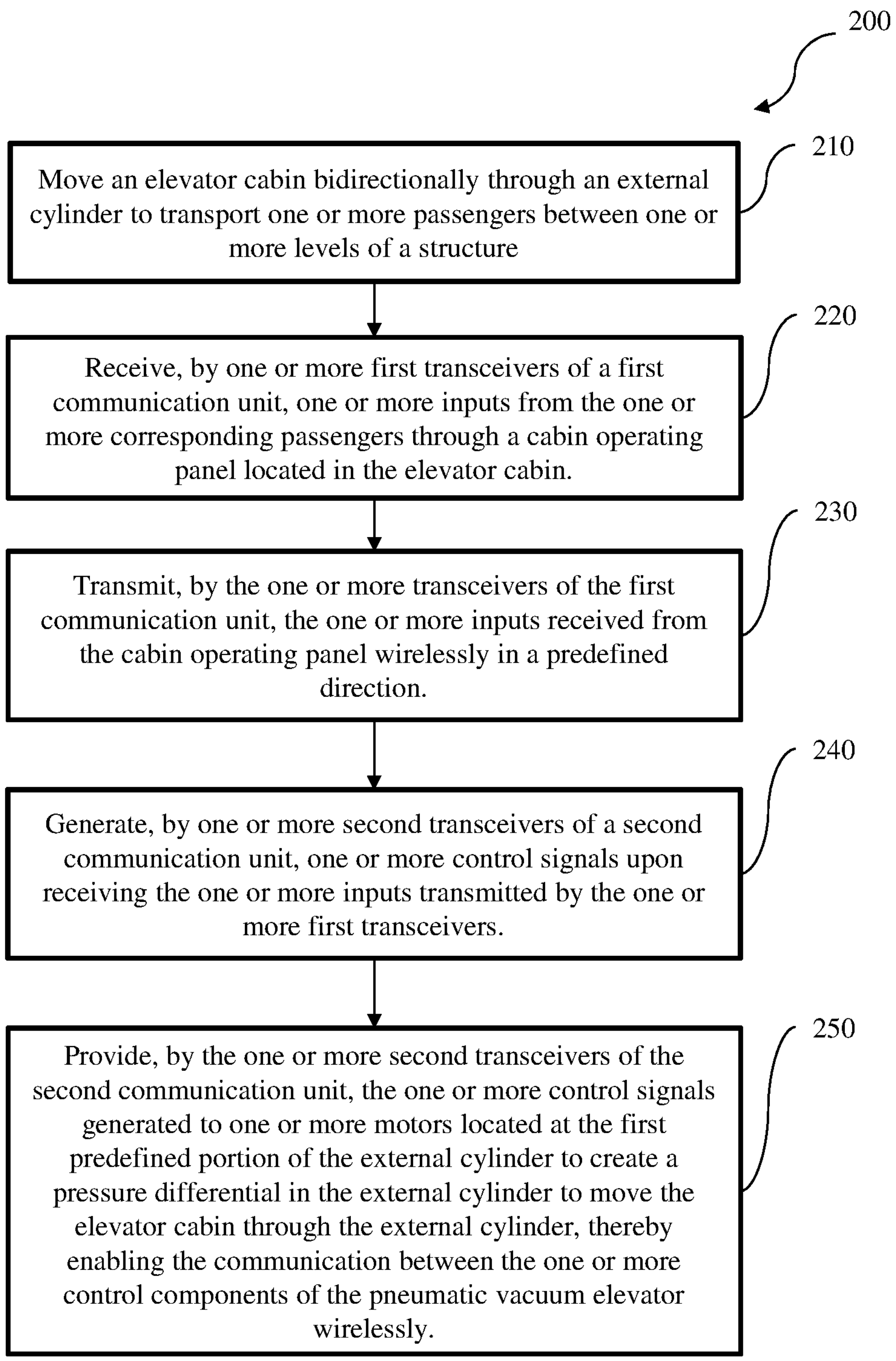
FIG. 2 is a flow chart representing the steps involved in a method to enable communication between one or more control components of a pneumatic vacuum elevator in accordance with an embodiment of the present disclosure.

FIG. 2 is a flow chart representing the steps involved in a method 200 to enable communication between one or more control components of a pneumatic vacuum elevator in accordance with an embodiment of the present disclosure. The method 200 includes moving an elevator cabin bidirectionally through an external cylinder to transport one or more passengers between one or more levels of a structure in step 210. In one embodiment, the one or more control components may include, but not limited to, a shaft controller, a cabin controller, a landing operating panel and the like. In some embodiments, the structure may include, but not limited to, a building, a maritime vessel and the like.

Further, in one embodiment, the elevator cabin may include an energy storage unit to power one or more electrical appliances associated with the elevator cabin. In such an embodiment, the energy storage unit may include, but not limited to, batteries, super capacitors and the like. In one embodiment, the one or more electrical appliances may include, but not limited to, lights, fans, music systems and the like. In some embodiments, the elevator cabin may include one or more light detection and ranging sensors positioned at least on a ceiling of the elevator cabin and a floor of the elevator cabin. In such an embodiment, the one or more light detection and ranging sensors may be adapted to relay one or more relative positions of the elevator cabin to the shaft controller to enable the shaft controller to regulate a speed of the elevator cabin.

The method 200 also includes receiving one or more inputs from the one or more corresponding passengers through a cabin operating panel located in the elevator cabin in step 220. In one embodiment, receiving one or more inputs from the one or more corresponding passengers through a cabin operating panel located in the elevator cabin includes receiving one or more inputs from the one or more corresponding passengers through a cabin operating panel located in the elevator cabin by one or more first transceivers of a first communication unit. In one embodiment, the one or more inputs may include a preferred level of the structure at which the one or more corresponding passengers may choose to get down.

The method 200 also includes transmitting the one or more inputs received from the cabin operating panel wirelessly in a predefined direction in step 230. In one embodiment, transmitting the one or more inputs received from the cabin operating panel wirelessly in a predefined direction includes transmitting the one or more inputs received from the cabin operating panel wirelessly in a predefined direction by the one or more transceivers of the first communication unit. As used herein, the predefined direction may be a direction at which another transceiver is positioned to receive the one or more inputs being transmitted by the one or more first transceivers.

The method 200 also includes generating one or more control signals upon receiving the one or more inputs transmitted by the one or more first transceivers in step 240. In one embodiment, generating one or more control signals upon receiving the one or more inputs transmitted by the one or more first transceivers includes generating one or more control signals upon receiving the one or more inputs transmitted by the one or more first transceivers by one or more second transceivers of a second communication unit. The second communication unit is positioned at a first predefined portion of the external cylinder. In one embodiment, the first predefined position may be located at, at least one of the extremities of the external cylinder.

The method 200 further includes providing the one or more control signals generated to one or more motors located at the first predefined portion of the external cylinder to create a pressure differential in the external cylinder to move the elevator cabin through the external cylinder in step 250. In one embodiment, providing the one or more control signals generated to one or more motors located at the first predefined portion of the external cylinder to create a pressure differential in the external cylinder to move the elevator cabin through the external cylinder includes providing the one or more control signals generated to one or more motors located at the first predefined portion of the external cylinder to create a pressure differential in the external cylinder to move the elevator cabin through the external cylinder by the one or more second transceivers of the second communication unit.

Further, in one embodiment, the one or more first transceivers and the one or more second transceivers may adapt line of sight communication. In some embodiments, the one or more motors may include an alternating current motor. In another embodiment, the one or more motors may include a direct current motor. In one embodiment, the one or more first transceivers and the one or more second transceivers may be adapted to communicate bidirectionally. In some embodiments, the one or more first transceivers and the one or more second transceivers may be adapted to communicate via at least one of a communication mode comprising bluetooth, long range radio and wireless fidelity. As used herein, the blue tooth may be defined as a standard used for enabling short range wireless communication.

Furthermore, as used herein, the long range radio may be defined as the standard used for long range wireless communication assisted with spread spectrum modulation. As used herein the wireless fidelity may be defined as the standard used to enable local area networking of various devises. In a specific embodiment, the one or more first transceivers and the one or more second transceivers may be adapted to interconnect through respective media access control (MAC) address. As used herein, the mac address may be defined as a physical address assigned to each of the devices present in a network to enable identification of the same. In one embodiment, the one or more first transceivers and the one or more second transceivers may be adapted to communicate each other by establishing a datalink layer between the one or more first transceivers and the one or more second transceivers. As used herein, the data link layer may be defined as a protocol layer responsible for enabling communication between devices present in the network across a physical layer.

Moreover, in some embodiments, the one or more first transceivers and the one or more second transceivers are adapted to establish a communication channel between the one or more first transceivers and the one or more second transceivers upon restarting at least one of the one or more first transceivers and the one or more second transceivers. In a specific embodiment, the one or more first transceivers and the one or more second transceivers may be adapted to establish a communication channel between the one or more first transceivers and the one or more second transceivers upon resetting at least one of the one or more first transceivers and the one or more second transceivers.

Various embodiments of the system and the method to enable communication between one or more control components of a pneumatic vacuum elevator described above enable various advantages. The one or more first transceivers and the one or more second transceivers are capable of providing a way to enable communication between the first communication unit and the second communication unit by eliminating the wires. Weight of the elevator cabin may be reduced by eliminating the wires, thereby achieve cost reduction while choosing the one or more motors associated with the pneumatic vacuum elevator.

Further, the wireless communication happening between the one or more first transceivers and the second transceivers may provide higher data rates compared to a wired connection, thereby ensuring smooth operation of the pneumatic vacuum elevator. Also, the one or more first transceivers and the one or more second transceivers are capable of providing esthetic appeal to the pneumatic vacuum elevator by eliminating the wires which otherwise may be overhanging through the external cylinder. By eliminating the wires, the one or more first transceivers and the one or more second transceivers are improving reliability of the pneumatic vacuum elevator.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and is not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A pneumatic vacuum elevator comprising:

an external cylinder (30);

an elevator cabin (20) positioned in the external cylinder (30), wherein the elevator cabin (20) is adapted to move bidirectionally through the external cylinder (30) to transport one or more passengers between one or more levels of a structure;

a cabin operating panel (60) located in the elevator cabin;

a first communication unit (40) operatively coupled to the elevator cabin (20), wherein the first communication unit (40) comprises one or more first transceivers (50) adapted to:

receive one or more inputs from the one or more corresponding passengers through the cabin operating panel (60);

wirelessly transmit the one or more inputs received from the cabin operating panel (60) in a predefined direction;

a second communication unit (70) communicatively coupled to the first communication unit (40) and positioned at a first predefined portion of the external cylinder (30), wherein the second communication unit (70) comprises one or more second transceivers (80) adapted to:

generate one or more control signals upon receiving the one or more inputs transmitted by the one or more first transceivers (50); and provide the one or more control signals generated to one or more motors located at the first predefined portion of the external cylinder (30) to create a pressure differential in the external cylinder (30) to move the elevator cabin through the external cylinder (30), thereby enabling communication between two or more control components of the pneumatic vacuum elevator, wherein the one or more first transceivers (50) and the one or more second transceivers (80) are adapted to establish a communication channel between the one or more first transceivers (50) and the one or more second transceivers (80) through respective media access control (MAC) address upon resetting at least one of the one or more first transceivers (50) and the one or more second transceivers (80).

2. The pneumatic vacuum elevator (10) as claimed in claim 1, wherein the one or more first transceivers (50) and the one or more second transceivers (80) are adapted to communicate bidirectionally.

3. The pneumatic vacuum elevator (10) as claimed in claim 1, wherein the one or more first transceivers (50) and the one or more second transceivers (80) are adapted to communicate each with other by establishing a datalink layer between the one or more first transceivers (50) and the one or more second transceivers (80).

4. The pneumatic vacuum elevator (10) as claimed in claim 1, wherein the one or more first transceivers (50) and the one or more second transceivers (80) are adapted to establish a communication channel between the one or more first transceivers (50) and the one or more second transceivers (80) upon restarting at least one of the one or more first transceivers (50) and the one or more second transceivers (80).

5. The pneumatic vacuum elevator (10) as claimed in claim 1, wherein the elevator cabin (20) comprises an energy storage unit to power one or more electrical appliances associated with the elevator cabin (20).

6. The pneumatic vacuum elevator (10) as claimed in claim 1, wherein the elevator cabin (20) comprises light detection and ranging sensors positioned at least on a ceiling of the elevator cabin (20) and a floor of the elevator cabin (20), wherein the light detection and ranging sensors are adapted to relay one or more relative positions of the elevator cabin (20) to a shaft controller to enable the shaft controller to regulate a speed of the elevator cabin (20).

7. A method for enabling communication among two or more control components of a pneumatic vacuum elevator comprising:

moving an elevator cabin of the pneumatic vacuum elevator bidirectionally through an external cylinder of the pneumatic vacuum elevator to transport one or more passengers between one or more levels of a structure;

receiving, by one or more first transceivers of a first communication unit, one or more inputs from the one or more corresponding passengers through a cabin operating panel located in the elevator cabin;

wirelessly transmitting, by the one or more transceivers of the first communication unit, the one or more inputs received from the cabin operating panel in a predefined direction;

generating, by one or more second transceivers of a second communication unit, one or more control signals upon receiving the one or more inputs transmitted by the one or more first transceivers, wherein the second communication unit is positioned at a first predefined portion of the external cylinder; and providing, by the one or more second transceivers of the second communication unit, the one or more control signals generated to one or more motors located at the first predefined portion of the external cylinder to create a pressure differential in the external cylinder to move the elevator cabin through the external cylinder, thereby enabling the communication between the two or more control components of the pneumatic vacuum elevator, wherein the one or more first transceivers (50) and the one or more second transceivers (80) are adapted to establish a communication channel between the one or more first transceivers (50) and the one or more second transceivers (80) through respective media access control (MAC) address upon resetting at least one of the one or more first transceivers (50) and the one or more second transceivers (80).

* * * * *